INVENTORS
RICHARD L. LEWIS
DONALD W. SMITH
BY Richard G. Geib
ATTORNEY

United States Patent Office 3,479,095
Patented Nov. 18, 1969

3,479,095
PROPORTIONING VALVE
Richard L. Lewis, St. Joseph, and Donald W. Smith, Williamston, Mich., assignors to The Bendix Corporation, a corporation of Delaware
Filed Dec. 29, 1967, Ser. No. 694,544
Int. Cl. B60t 8/22
U.S. Cl. 303—22                                          5 Claims

ABSTRACT OF THE DISCLOSURE

A hydraulic brake pressure modifying device interposed between a pressure generating device and a fluid motor having pressure responsive means with a different area exposed to the actuating pressure than that which is exposed to the pressure of the motor controlling a tilt valve regulating the bypass of fluid through the device.

SUMMARY

In automobiles having a split fluid system for operating the brake it has become desirable to incorporate a brake pressure modifying device for equating the effective braking force at the front and rear axles. The prior art devices generally comprise pressure responsive means with check valves or similar valve type devices adapted, when actuated, to move parallelly away from a seat against which the valve member is normally sealingly engaged.

It is a principal object of this invention to improve upon these prior art devices by incorporating a tilt valve with the pressure responsive device whereby lever principles may be brought into the device to aid in valve operation.

DRAWING DESCRIPTION

Figure 1:
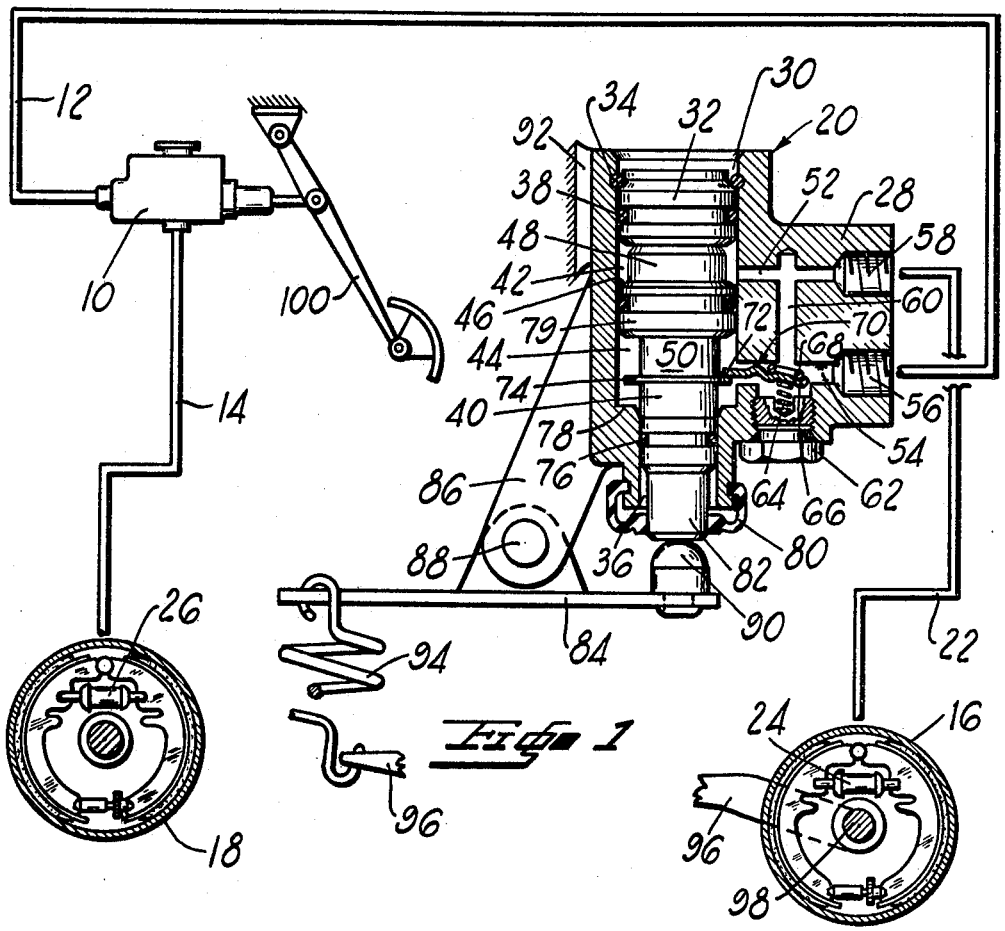
Figure 2:
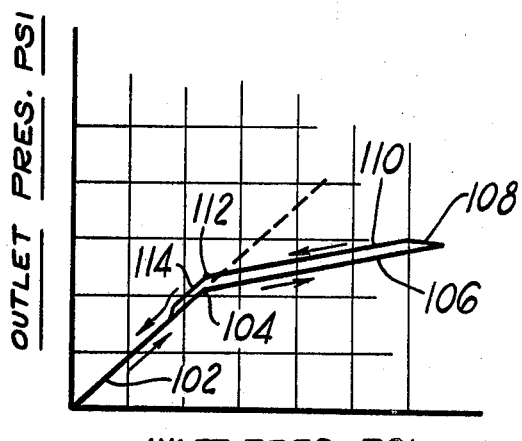

Other objects and advantages will become apparent from the following description taken in connection with the accompanying drawings in which:

FIGURE 1 is a schematic view of a vehicle brake system employing a valve shown in cross section and embodying the features of this invention; and FIGURE 2 is a graphical illustration of the inlet pressure and outlet pressure curve for a braking system incorporating the valve of FIGURE 1.

DETAILED DESCRIPTION

Referring now to FIGURE 1, there is shown a split system master cylinder 10 having conduits 12 and 14 leading to a vehicle's rear brakes 16 and a vehicle's front brakes 18, respectively. As seen, a brake pressure modifying device 20 is connected to conduit 12 and has leading therefrom a conduit 22 for connection with a wheel cylinder 24 of the rear brakes 16; whereas the conduit 14 leads directly from the master cylinder 10 to the wheel cylinder 26 of the front brakes 18.

With more particular regard now to the structure of the brake pressure modifying device 20, it is seen that this device includes a housing 28 having a bore 30 closed at one end by a plug 32 held therein by a snap ring 34. The bore is of a stepped design to have a reduced cross section 36 as it emerges from the end of the housing 28 opposite that in which the plug 32 is placed. It should be noted also that the plug 32 is provided with an O-ring seal 38 to maintain the integrity of the bore thereunder. Prior to the insertion of the plug 32 a stepped piston 40 is inserted into the bore to define chambers 42 and 44 within the bore 30. This stepped piston 40 is provided with a large annular face 46 separating a large boss 48 on the upward side thereof, as viewed in FIGURE 1, and a smaller depending or downwardly projecting boss 50 therefrom such that the areas of chambers 42 and 44 are different to provide different effective areas on respective ends of the piston 40.

Housing 28 is cross drilled as at 52 and 54 to communicate the bore 30 with inlet 56 connected to conduit 12 and outlet 58 connected to conduit 22. These passages 52 and 54 are connected by a passage 60 within the housing which is opened outwardly of the housing to receive a plug 62 which upon threadedly assembling it to the housing 28 maintains a load by means of a spring 64 on a valve 66 adapted to overlie the inlet of passage 54 to the passage 60.

The valve 66 has a rubber ring 68 bonded thereto for cooperation with the inlet opening of passage 54 to passage 60 and is formed with a metal plate having a crimped portion acting as a pivot point 70 with respect to the housing 28 within the passage 54. The metal plate has also a leg 72 entering into the chamber 44 for engagement with a flange 74 on the boss 50, which flange 74 will also form a stop for the piston 40 in its downward travel.

The boss 50 projects into the smaller diameter portion 36 of the bore 30 and has a piston face with an O-ring seal 76 to maintain the integrity of chamber 44 between the shoulder 78 and the land 79 of the piston 40.

The construction of the device 20 is then completed by connecting a rubber boot 80 to the housing 28 and to the end 82 of the piston 40 projecting from the smaller portion 36 of the bore 30, and attaching a lever 84 to an ear 86 from the housing, as by a pin 88, which lever has a button 90 for engagement with the end 82 of the piston 40.

With regard to the installation of the device 20 to the vehicle, it may be installed by fixing it to the chassis, as at 92, of the vehicle with a spring 94 connecting the lever 84 to an arm 96 connected to the rear axle 98. With this type of installation the device 20 is rendered load responsive as well as pressure responsive in controlling the delivery of fluid pressure to the wheel cylinders 24. It should be realized by those skilled in the art, that the device 20 may be purely a pressure responsive device; i.e., the lever 84 may be eliminated and a spring adapted to piston 40 so that the valve will still function as a pressure modifiying device.

OPERATION

In operation, the vehicle operator upon depressing brake pedal 100 will generate separate pressures within the master cylinder 10 for conduits 12 and 14. The pressure in conduit 14 will immediately start braking of the front wheel brakes 18; whereas the pressure in the conduit 12 will pass into the inlet 56 and, as the valve 66 will be in the attitude shown because of the larger effective area of the face 46 in the chamber 42 with respect to the effective area of piston 40 in the chamber 44, the inlet pressure will first pass via passage 60 in the device 20 to the passage 52, and thus into the chamber 42 and via outlet 58 to the conduit 22 to start expanding the shoe brakes by the wheel cylinders 24. As the pressure begins to increase, the fact that atmospheric pressure exists in bore portion 36 under seal 76 and that hydraulic pressure in chambers 42 and 44 are equal causes piston 40 to move downwardly, as viewed in FIGURE 1, to withdraw the flange 74 from the end 72 of the metal plate of the valve 66 whereby spring 64 will cause the rubber seat 68 to overlie the inlet of the passage 54 into the passage 60 restricting the direct communication of the conduit 12 with the conduit 22. Upon a predetermined pressure increase to the wheel cylinders 24 the piston 40 will have translated downwardly to a position where the valve 66 closes the communication of passage 54 with passage 60 in the housing 28 terminating the communication of fluid from the master cylinder 10 to the wheel cylinders 24.

With reference now to FIGURE 2 the foregoing operation will provide an inlet pressure and an outlet pressure relationship according to the line 102 with the change in slope, as at 104, being the point at which the valve 66 begins modulation of fluid pressure. Thereafter for every increasing increment of pressure for the master cylinder 10 the fluid pressure increase to the wheel cylinders 24 will be increased according to the line 106. This is a result of the inlet pressure from conduit 12 being introduced to the chamber 44 to move the piston 40 upwardly whereby the valve 66 may be slightly opened to port more pressure to the wheel cylinders 24 until pressure in chamber 42 can position the piston 40 downwardly again to close the valve 66.

Upon release of the brake pedal 100, there will be a slight delay represented by the line 108 caused by seal friction etc. in retarding the movement of the piston 40 to its released attitude and the opening of the tilt valve 66 whereafter the fluid pressure will return to the master cylinder along the line 110 until pressure in chamber 42 is reduced sufficiently to permit the slope of this line to change as at point 112 to a slope as indicated by line 114 until it is completely returned to the starting line pressure.

In the return cycle the spring 94, in the embodiment shown, acts as a biasing force on the piston 40 to permit the opening of the tilt valve 66. It may be understood that a spring of this nature may well be incorporated in the housing 28 between the shoulder 78 and the flange 74 to accomplish the same purpose. However, the spring 94 serves an important function other than this in that it provides a means for regulating the attitude of the piston 40 in the bore 30 in accordance with the loading on the vehicle. As mentioned, the spring 94 is mounted between the lever 84 and an arm 96 from the axle of the vehicle. As the valve housing 28 is mounted, as at 92, to the vehicle body it is seen that variations in height between the axle and the body will be accounted for in the positioning of the piston 40. Thus the pressure modulating valve 20 functions to regulate more or less pressure depending upon whether the vehicle is heavily or lightly loaded.

We claim:

1. A hydraulic pressure modulating device comprising:
a housing having a wall defining a bore within the housing;
fluid inlet and outlet passages extending through said wall to communicate with the bore;
a conduit in said wall interconnecting said passages;
a pressure responsive control element in said bore having an effective area of larger diameter at one end forming a chamber at one end in communication with the outlet passage and an effective area of lesser dimensions at the other end forming a chamber at the other end in fluid communication with said inlet passage such that the chamber at one end and the chamber at the other end are two variable volume chambers created in the bore by the pressure responsive control element, said pressure responsible control element having a flange;
a value means in said inlet passage adapted to control communication of fluid pressure between said inlet and outlet passages via said conduit by being operatively connected to the flange of the pressure responsive control element to be positioned thereby so that in a normal attitude the inlet passage is communicated to the larger and lesser effective areas of the pressure responsive control element and the outlet port, said valve means being movable in the event of a development of fluid pressure to close such communication to thereafter in accordance with pressure differential across said pressure responsive control element moderate a lesser fluid pressure to the outlet than that received at the inlet.

2. A fluid pressure device according to claim 1 and further characterized in that said pressure responsive control element is comprised of a slidable stepped piston having its greater effective area subjected to fluid pressure at said outlet passage and its lesser effective area subject to fluid from said inlet passage with said flange on said element being adjacent the lesser effective area.

3. A fluid pressure device according to claim 1 wherein said valve has a stem extending from the passage means into the bore for operative connection with said flange and a spring normally urging said valve to close said conduit.

4. A fluid pressure device according to claim 1 and further comprising a load sensitive means operatively biasing said piston in accordance with the load imposed on the load sensitive means to thereby vary the degree of moderation of the fluid pressure through the device by the valve in accordance with this load.

5. A hydraulic pressure modulating device comprising:
a housing having a bore and passage means with first and second portions communicated to said bore and to respective outlet and inlet openings for receiving and delivering fluid pressure and a third portion communicating said first and second portions internally of said housing;
a pressure responsive control element in said bore having an effective area of larger diameter at one end forming a chamber at one end in communication via the first portion of the passage means to the outlet and an effective area of lesser dimensions at the other end forming a chamber at the other end in fluid communication via the second portion of said passage means to said inlet such that the chamber at one end and the chamber at the other end are two variable volume chambers created in the bore by the pressure responsive control element, said pressure responsive control element having a flange;
a valve means disposed in said second portion adapted to control communication of fluid pressure between said first and second portions via said third portion by being operatively connected to the flange of the pressure responsive control element to be positioned thereby so that in a normal attitude the inlet is communicated via the passage means to the larger and lesser effective areas of the pressure responsive control element and the outlet port, said valve means being movable in the event of a development of fluid pressure to close such communication to thereafter in accordance with pressure differential across said pressure responsive control element moderate a lesser fluid pressure to the outlet than that received at the inlet;
said valve including a stem extending from the passage means into the bore for operative connection with said flange, a spring normally urging said valve to close said passage means, and a plate having a rubber ring at the end thereof opposite the stem extending into the bore, and adjacent thereto a crimped projection for abutment with the wall of one of the passages of the passage means for controlling the fluid communication in accordance with the position of the piston.

(References on following page)

References Cited

UNITED STATES PATENTS

| | | |
|---|---|---|
| 2,921,033 | 7/1942 | Goepfrich. |
| 3,209,656 | 10/1965 | Thieme _____ 137—596.18 XR |
| 3,233,947 | 2/1966 | Oberthur _____ 303—22 |
| 3,237,997 | 3/1966 | Kerr _____ 303—22 |
| 3,379,479 | 4/1968 | Lepelletier _____ 303—22 |

FOREIGN PATENTS 911,096  11/1962  Great Britain.

MILTON BUCHLER, Primary Examiner
JOHN J. McLAUGHLIN, JR., Assistant Examiner

U.S. Cl. X.R.

137—596.18; 188—152; 303—6